US012344005B2

(12) United States Patent
Lee et al.

(10) Patent No.: US 12,344,005 B2
(45) Date of Patent: Jul. 1, 2025

(54) INK TREATMENT APPARATUS AND METHOD

(71) Applicant: SEMES CO., LTD., Cheonan-si (KR)

(72) Inventors: Dong Hwa Lee, Asan-si (KR); Dai Geon Yoon, Asan-si (KR); Soo Hong Lee, Hwaseong-si (KR); Bong Man Choi, Cheonan-si (KR); Dae Sung Kim, Cheonan-si (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 168 days.

(21) Appl. No.: 18/302,323

(22) Filed: Apr. 18, 2023

(65) Prior Publication Data

US 2024/0217243 A1 Jul. 4, 2024

(30) Foreign Application Priority Data

Dec. 30, 2022 (KR) ........................ 10-2022-0190701

(51) Int. Cl.
*B41J 2/175* (2006.01)
*B41J 29/393* (2006.01)

(52) U.S. Cl.
CPC ......... *B41J 2/17596* (2013.01); *B41J 29/393* (2013.01)

(58) Field of Classification Search
CPC ......... B41J 2/17596; B41J 29/393; B41J 2/18
See application file for complete search history.

(56) References Cited

U.S. PATENT DOCUMENTS

| | | | | |
|---|---|---|---|---|
| 8,403,439 | B2 * | 3/2013 | Tanaka | B41J 29/38 347/17 |
| 10,259,233 | B2 * | 4/2019 | Rietbergen | B41J 2/175 |
| 11,724,512 | B2 * | 8/2023 | Nakata | B41J 29/13 347/85 |

FOREIGN PATENT DOCUMENTS

| | | | |
|---|---|---|---|
| KR | 20040054683 | A | 6/2004 |
| KR | 20160095341 | A | 8/2016 |
| KR | 10-2021-0069649 | A | 6/2021 |
| KR | 102301582 | B1 | 9/2021 |
| KR | 102325767 | B1 | 11/2021 |
| KR | 10-2022-0065948 | A | 5/2022 |

OTHER PUBLICATIONS

Office Action for Korean Application No. 10-2022-0190701 dated Oct. 29, 2024.

* cited by examiner

*Primary Examiner* — An H Do
(74) *Attorney, Agent, or Firm* — Harness, Dickey & Pierce, P.L.C.

(57) ABSTRACT

An ink treatment apparatus and method are provided. The ink treatment apparatus includes: a reservoir storing ink; a head module ejecting the ink; a first control valve controlling a flow of the ink; a plurality of fluid transfer lines installed between the reservoir and the head module and having the ink flow therein; a pump installed in the fluid transfer lines to pump the ink; a flow rate measurement module installed in the fluid transfer line, the flow rate measurement module measuring a flow rate of the ink in accordance with the flow of the ink and providing ink flow rate information that is information regarding the flow rate of the ink; and a control module controlling a circulation ratio of the ink between the fluid transfer lines by controlling the pump and the first control valve based on the ink flow rate information.

19 Claims, 10 Drawing Sheets

INK TREATMENT APPARATUS AND METHOD

CROSS-REFERENCE TO RELATED APPLICATION

This application claims priority from Korean Patent Application No. 10-2022-0190701 filed on Dec. 30, 2022 in the Korean Intellectual Property Office, and all the benefits accruing therefrom under 35 U.S.C. 119, the contents of which in its entirety are herein incorporated by reference.

BACKGROUND

1. Field

The present disclosure relates to an ink treatment apparatus and method.

2. Description of the Related Art

A plurality of paths, along which ink flows, are provided in an ink circulation supply system of an inkjet head, and different circulation flow rates need to be set for these paths for different purposes (e.g., a high flow rate circulation for preventing particle sedimentation for an ink reservoir and a low flow rate circulation for minimizing the effect of ejection for a head). To this end, however, a plurality of power units corresponding to a plurality of routes are required, and increases in the number of power units limit the miniaturization of ink supply apparatuses and result in increases in cost.

SUMMARY

Aspects of the present disclosure provide setting an appropriate circulation flow rate for each ink movement path depending on their purpose when performing inkjet printing on a target object (e.g., a substrate).

Aspects of the present disclosure also provide covering a plurality of ink movement paths with a single power unit in connection with the setting of a circulation flow rate.

Aspects of the present disclosure also provide preventing the size of an ink supply apparatus from increasing due to an increase in the number of power units and enabling the miniaturization of the ink supply apparatus.

Aspects of the present disclosure also provide reducing the cost associated with ink treatment by preventing cost from being incurred by an increase in the number of power units.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, an ink treatment apparatus includes: a reservoir storing ink; a head module ejecting the ink; a first control valve controlling a flow of the ink; a plurality of fluid transfer lines installed between the reservoir and the head module and having the ink flow therein; a pump installed in the fluid transfer lines to pump the ink; a flow rate measurement module installed in the fluid transfer lines, the flow rate measurement module measuring a flow rate of the ink in accordance with the flow of the ink and providing ink flow rate information that is information regarding the flow rate of the ink; and a control module controlling a circulation ratio of the ink between the fluid transfer lines by controlling the pump and the first control valve based on the ink flow rate information.

According to another aspect of the present disclosure, an ink treatment apparatus includes: a reservoir storing ink; a head module ejecting the ink; a first control valve controlling a flow of the ink; a plurality of fluid transfer lines installed between the reservoir and the head module and having the ink flow therein; a pump installed in the fluid transfer lines to pump the ink; a flow rate measurement module installed in the fluid transfer lines, the flow rate measurement module measuring a flow rate of the ink in accordance with the flow of the ink and providing ink flow rate information that is information regarding the flow rate of the ink; and a control module controlling a circulation ratio of the ink between the fluid transfer lines by controlling the pump and the first control valve based on the ink flow rate information, wherein the fluid transfer lines include a supply line, which is a first path and allows the reservoir and the head module to communicate with each other, a retrieval line, which is a second path different from the first path and allows the reservoir and the head module to communicate with each other, and a circulation line, which is a third path different from the first path and communicates with the retrieval line such that the ink can be supplied to the retrieval line, the flow rate measurement module includes a first flow rate measurement part, which is installed in the retrieval line and provides first ink flow rate information of the retrieval line, and a second flow rate measurement part, which is installed in the circulation line and provides second ink flow rate information of the circulation line, the control module controls a circulation flow rate ratio of the ink between the first, second, and third paths based on the first ink flow rate information and the second flow rate information, and the ink treatment apparatus includes a first condition that the circulation line is positioned above at least part of the supply line in a length direction toward the head module and a second condition that the inner diameter of the supply line is equal to or greater than the inner diameter of the circulation line.

According to another aspect of the present disclosure, an ink treatment method includes: supplying and storing ink in a reservoir of an ink treatment apparatus; and operating the ink between a head module and the reservoir of the ink treatment apparatus, wherein the ink treatment apparatus includes a first control valve, which controls a flow of the ink, a plurality of fluid transfer lines, which are installed between the reservoir and the head module and have the ink flow therein, a pump, which is installed in the fluid transfer lines to pump the ink, a flow rate measurement module, which is installed in the fluid transfer lines, measures a flow rate of the ink in accordance with the flow of the ink, and provides ink flow rate information that is information regarding the flow rate of the ink, and a control module, which controls a circulation ratio of the ink between the fluid transfer lines by controlling the pump and the first control valve based on the ink flow rate information.

According to the aforementioned and other embodiments of the present disclosure, an appropriate circulation flow rate can be set for each ink movement path depending on their purpose when performing inkjet printing on a target object (e.g., a substrate).

A plurality of ink movement paths can be covered with a single power unit in connection with the setting of a circulation flow rate.

The size of an ink supply apparatus can be prevented from increasing due to an increase in the number of power units, and the ink supply apparatus can be miniaturized.

The cost associated with ink treatment can be reduced by preventing cost from being incurred by an increase in the number of power units.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
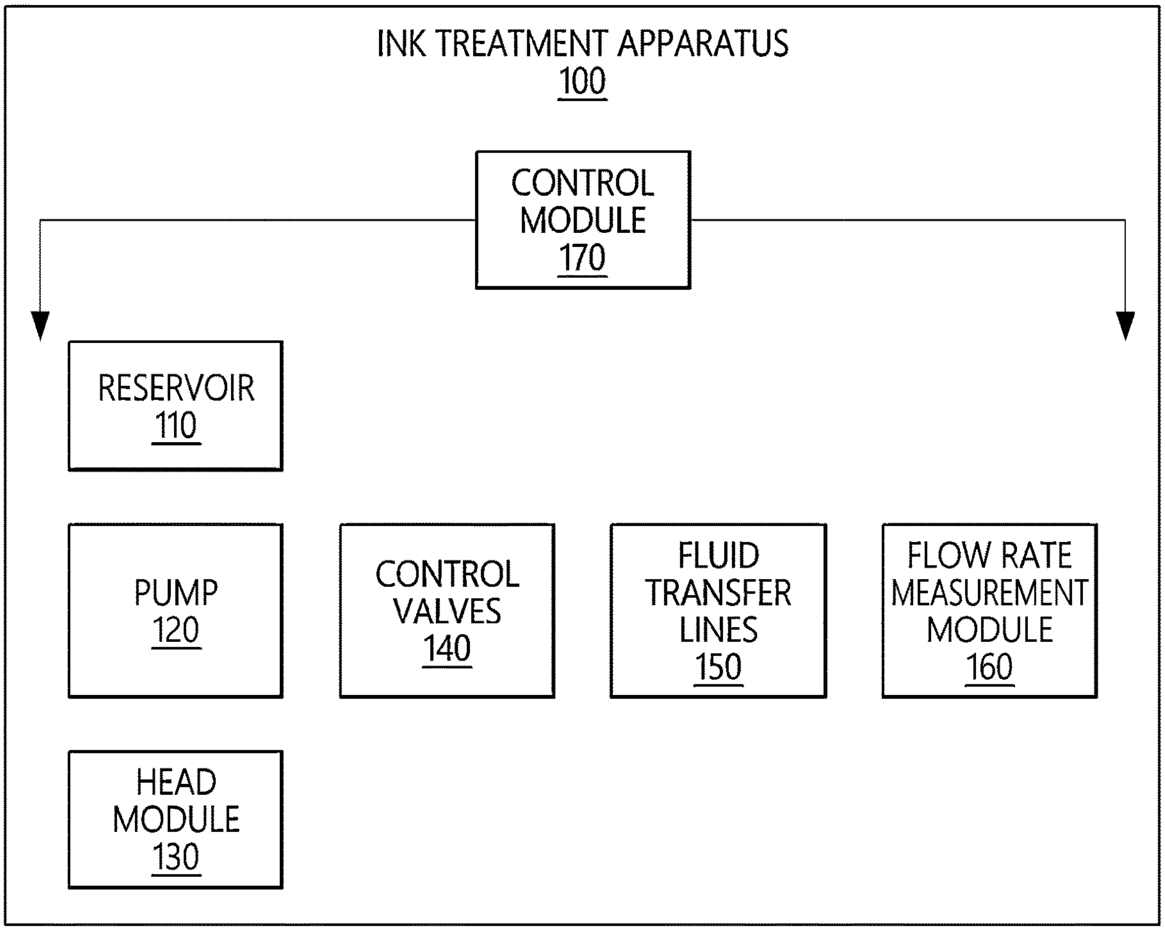
FIG. 1 is a block diagram of an ink treatment apparatus according to an embodiment of the present disclosure.

Preferred embodiments of the present disclosure will be described in detail with reference to the accompanying drawings. The present disclosure and methods of accomplishing the same may be understood more readily by reference to the following detailed description of embodiments and the accompanying drawings. However, the present disclosure may be embodied in many different forms, and should not be construed as being limited to the embodiments set forth herein. Rather, these embodiments are provided so that this disclosure will be through and complete and will fully convey the concept of the invention to those skilled in the art, and the present disclosure will only be defined by the appended claims. Like reference numbers designate like elements throughout the specification.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented, and, as such, the spatially relative descriptors used herein interpreted accordingly.

It will be understood that, although the terms "first", "second", etc. may be used herein to describe various elements, constituent elements and/or sections, the elements, constituent elements and/or sections should not be limited by these terms. These terms are only used to distinguish one element, constituent element, or section from another element, constituent element, or section. Thus, a first element, a first constituent element, or a first section discussed below should be termed a second element, a second constituent element, or a second section.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Exemplary embodiments of the present disclosure will hereinafter be described with reference to the accompanying drawings. Like reference numerals indicate like elements through the specification, and thus, detailed descriptions thereof will be omitted.

Referring to FIG. 1, an ink treatment apparatus 100 according to an embodiment of the present disclosure includes a reservoir 110, a pump 120, a pump 120, a head module 130, control valves 140, fluid transfer lines 150, a flow rate measurement module 160, and a control module 170.

Figure 2:
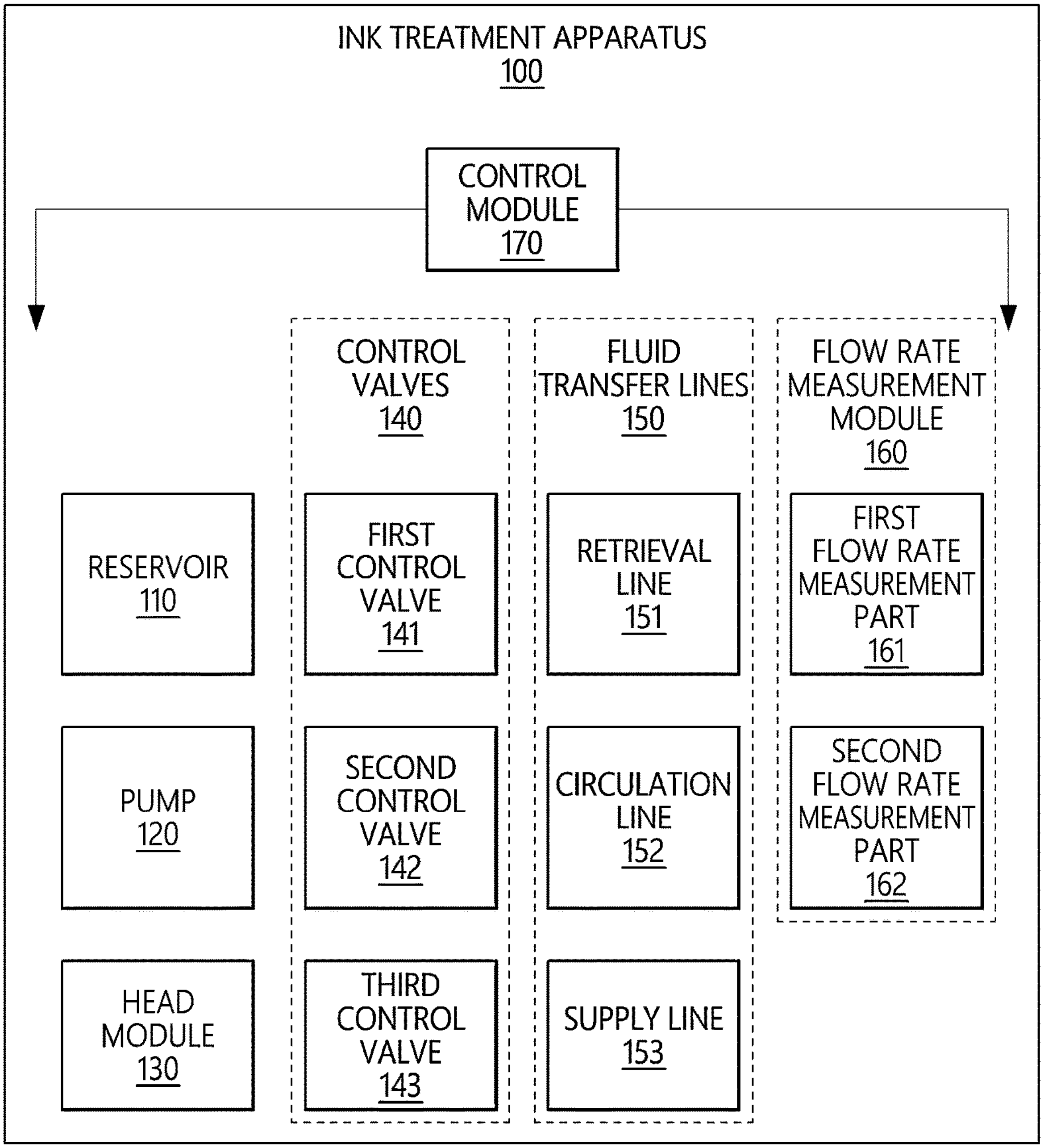
FIG. 2 is a detailed block diagram of the ink treatment apparatus of FIG. 1.
Figure 3:
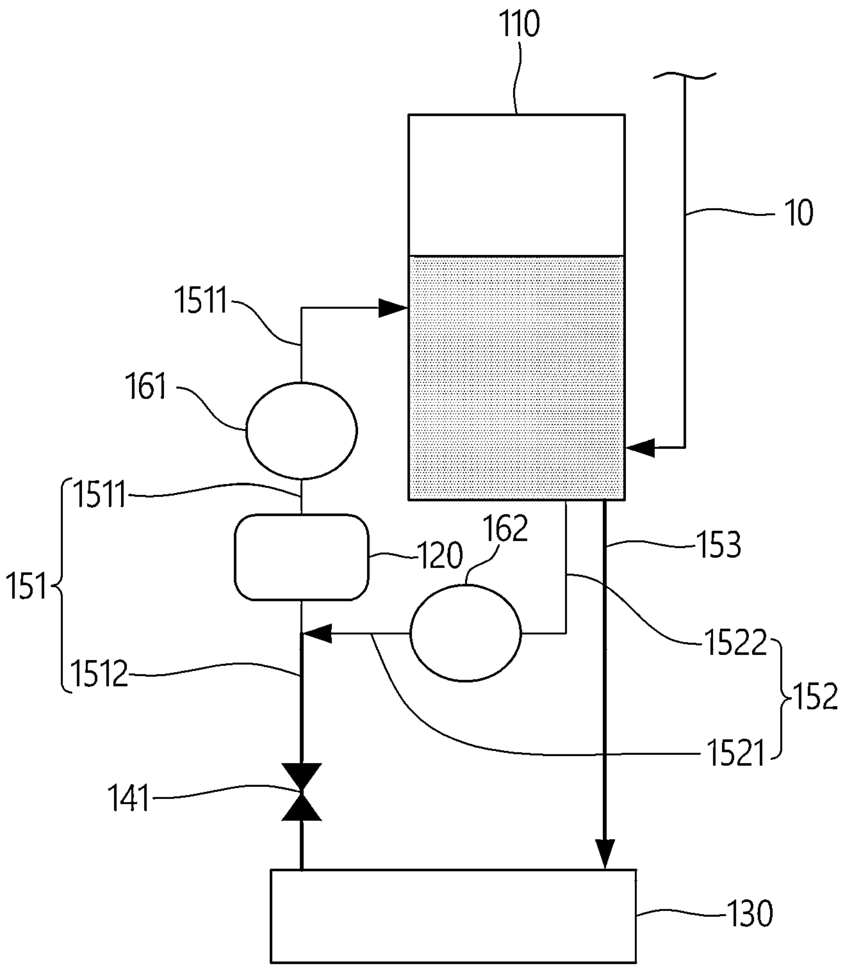
FIG. 3 is a schematic view illustrating the structure of the ink treatment apparatus of FIG. 1.

Referring to FIGS. 2 and 3, the control valves 140 include first, second, and third control valves 141, 142, and 143. The fluid transfer lines 150 include a retrieval line 150, a circulation line 152, and a supply line 153.

The flow rate measurement module 160 includes first and second flow rate measurement parts 161 and 162. The retrieval line 151 includes a first retrieval line 1511 and a second retrieval line 1512. The circulation line 152 includes a first circulation line 1521 and a second circulation line 1522.

Figure 4:
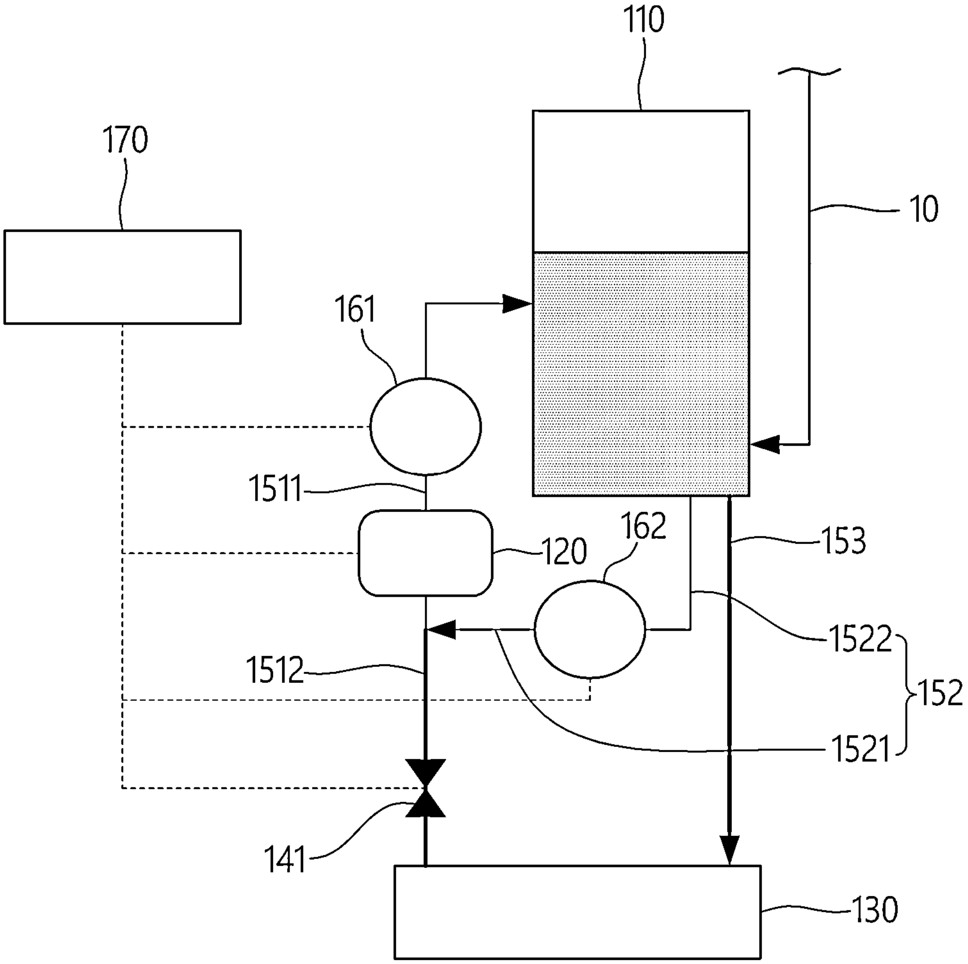
FIG. 4 is a schematic view illustrating how the ink treatment apparatus of FIG. 3 is controlled.

Referring to FIGS. 2 and 4, the reservoir 110 of the ink treatment apparatus 100 stores ink therein. The head module 130 of the ink treatment apparatus 100 ejects ink. The first control valve 141 controls the flow of the ink.

A plurality of fluid transfer lines 150 may be installed between the reservoir 110 and the head module 130, and the ink flows and moves along the fluid transfer lines 150. The pump 120 of the ink treatment apparatus 100 may be installed in the fluid transfer lines 150 to pump the ink.

A single pump 120 may be provided to correspond to a plurality of fluid lines and may thus allow fluid circulation flow rate to be set for each of the plurality of fluid lines. The flow rate measurement module 160 of the ink treatment apparatus 100 may be installed in the fluid transfer lines 150.

The flow rate measurement module 160 measures the flow rate of the ink in accordance with the flow of the ink and thereby provides ink flow rate information, which is information regarding the flow rate of the ink. The control module 170 controls the pump 120 and the first control valve 141 based on the ink flow rate information.

In this manner, the control module 170 controls the circulation ratio of the ink between the fluid transfer lines 150. The retrieval line 151, which is a first path, allows the reservoir 110 and the head module 130 to communicate with each other.

The ink treatment apparatus 100 may be provided to meet a first condition that the circulation line 152 is positioned above at least part of the supply line 153 in a length direction toward the head module 130. The ink treatment apparatus 100 may also be provided to meet a second condition that the inner diameter of the supply line 153 is equal to or greater than the inner diameter of the circulation line 152.

The treatment apparatus 100 may meet at least one of the first and second conditions. The second condition assumes that there exists no entity resisting the circulation of a fluid between the supply line 153 and the head module 130.

The retrieval line 151, which is a second path different from the first path, allows the head module 130 and the reservoir 110 to communicate with each other. The circulation line 152, which is a third path different from the first path, communicates with the retrieval line 151 such that the ink can be supplied to the retrieval line 151.

The control module 170 of the ink treatment apparatus 100 controls the first control valve 141 and thereby controls the circulation flow rate ratio of the ink between the first, second, and third paths.

The first flow rate measurement part 161 of the flow rate measurement module 160 is installed in the retrieval line 151. The first flow rate measurement part 161 provides first ink flow rate information, which is ink flowrate information obtained from the retrieval line 151. The pump 120 is installed in the retrieval line 151.

The first retrieval line 1511 of the retrieval line 151 corresponds to part of the retrieval line 151 between the pump 120 and the reservoir 110. The second retrieval line 1512 corresponds to part of the retrieval line 151 between the pump 120 and the head module 130.

The first flow rate measurement part 161 is installed in the first retrieval line 1511 to provide the first ink flow rate information in response to the ink being pumped by the pump 120. The pump 120 pumps and supplies the ink the ink from the second retrieval line 1512 and the circulation line 152 into the first retrieval line 1511.

The first control valve 141 is installed in the second retrieval line 1512. The control module 170 performs a first control operation of controlling the flow rate of the ink supplied from the head module 130 to the pump 120, via the first control valve 141 and the pump 120.

The control module 170 primarily performs the first control operation based on the first ink flow rate information. The control module 170 obtains first updated ink flow rate information, which is updated first ink flow rate information, from the first flow rate measurement part 161 in response to the first control operation.

The control module 170 performs a second control operation of controlling the flow rate of the ink supplied from the head module 130 to the pump 120, based on the first updated ink flow rate information via the first control valve 141 and the pump 120.

The control module 170 performs a second control operation based a first control operation of the first flow rate measurement part 161. Also, the control module 170 may repeatedly perform control in a feedback manner via an n-th control operation based on the second control operation such that a predetermined circulation flow rate ratio may be reached.

The second flow rate measurement part 162 of the flow rate measurement module 160 is installed in the circulation line 152 and provides second ink flow rate information, which is ink flow rate information obtained from the circulation line 152. The control module 170 primarily performs the first control operation based on the first ink flow rate information and the second ink flow rate information.

The control module 170 obtains second updated ink flow rate information, which is updated second ink flow rate information, from the second flow rate measurement part 162 in response to the first control operation and performs the second control operation based on the first updated ink flow rate information and the second updated ink flow rate information.

The second control valve 142, which is a different valve from the first control valve 141, is installed in the supply line 153.

The control module 170 performs the first and second control operations by controlling the pump 120 and the first and second control valves 141 and 142. The third control valve 143 is a different valve from the first control valve 141.

The third control valve 143 is installed in the circulation line 152. The control module 170 performs the first and second control operations by controlling the pump 120 and the first, second, and third control valves 141, 142, and 143.

The first circulation line 1521 of the circulation line 152 corresponds to part of the circulation line 152 between the second flow rate measurement part 162 and the retrieval line 151. The second circulation line 1522 of the circulation line 152 corresponds to part of the circulation line 152 between the second flow rate measurement part 162 and the supply line 153.

Ink treatment apparatuses according to other embodiments of the present disclosure will hereinafter be described, focusing mainly on the differences with the ink treatment apparatus of FIG. 1.

Figure 5:
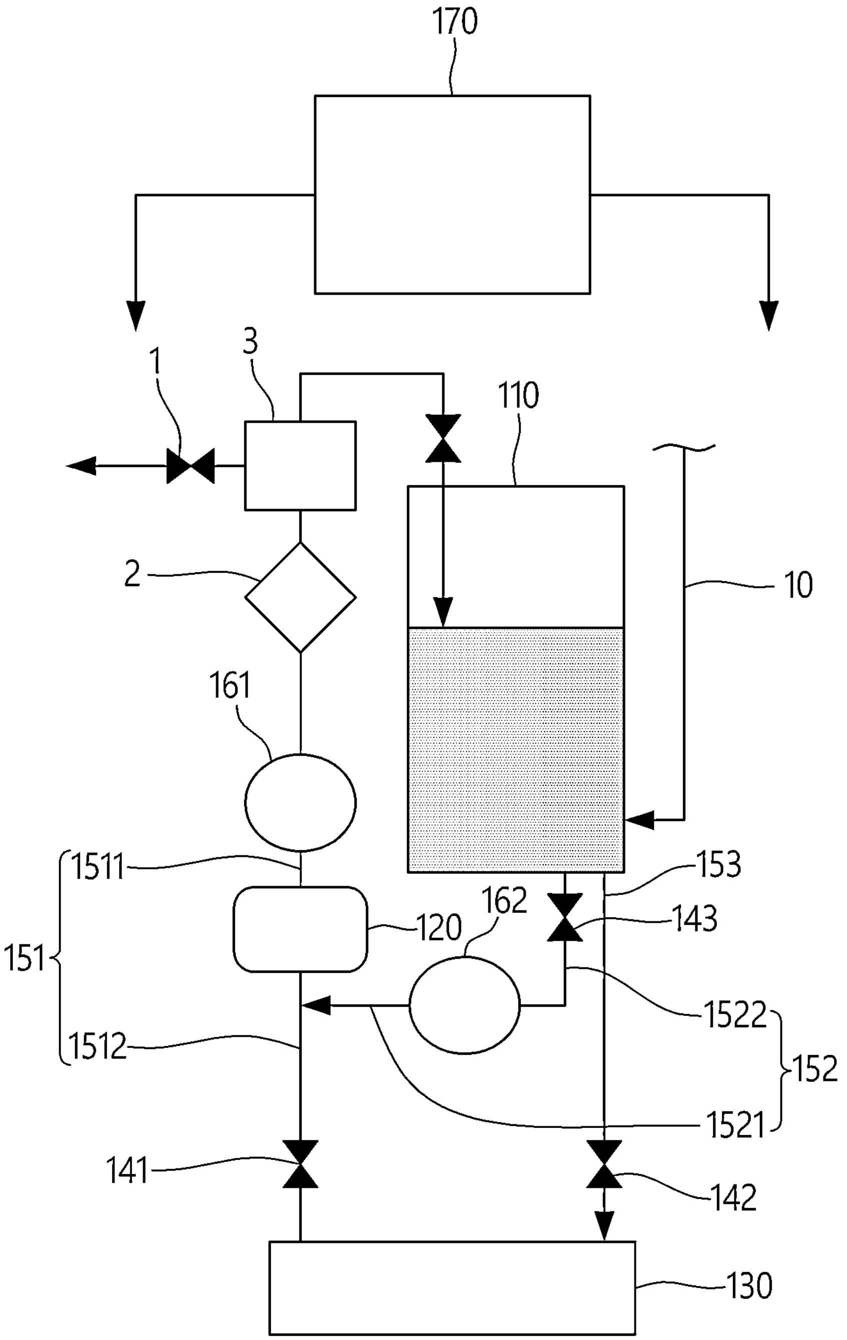
FIG. 5 is a schematic view of an ink treatment apparatus according to another embodiment of the present disclosure.

Referring to an ink treatment apparatus 100 of FIG. 5, a third control valve 143 is installed in a second circulation line 1522 of a circulation line 152. The third control valve 143 may be placed in a first arrangement state where the second circulation line 1522 is not positioned collinearly with a first circulation line 1521 and with a second flow rate measurement part 162.

In the first arrangement state, the control module 170 increases the flow rate of ink in a retrieval line 151 by controlling a pump 120 if second ink flow rate information obtained from the second flow rate measurement part 162 is yet to reach a predetermined target value.

The control module 170 increases the flow rate of the ink such that as the ink from the circulation line 152 joins the retrieval line 151, the target value can be reached.

A degasser 2 and a filter 3 are provided on a first retrieval line 1511, between a first flow rate measurement part 161 and the reservoir 110. A drain valve 1, which is for draining the ink to the outside, is provided in the filter 3. The control module 170 additionally controls the circulation flow rate of the ink by controlling the drain valve 1.

Figure 6:
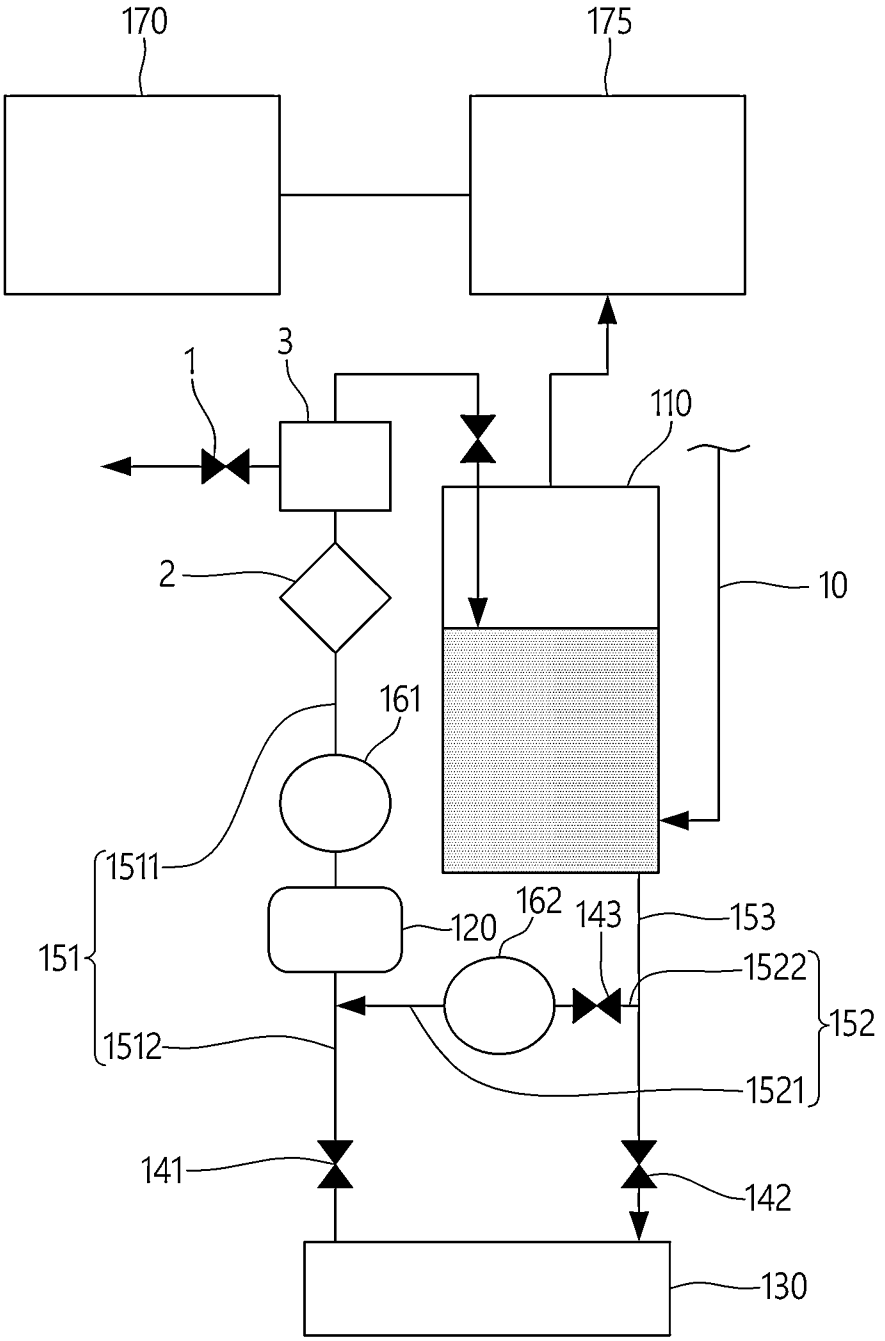
FIG. 6 is a schematic view of an ink treatment apparatus according to another embodiment of the present disclosure.

Referring to an ink treatment apparatus 100 of FIG. 6, a third control valve 143 is installed in a second circulation line 1522 of a circulation line 152. The third control valve 143 may be placed in one of first and second arrangement states.

In the first arrangement state, the second circulation line 1522 is not positioned collinearly with a first circulation line 1521 and with a second flow rate measurement part 162. In the second arrangement state, the second circulation line 1522 is positioned collinearly with the first circulation line 1521 and with the second flow rate measurement part 162.

A control module 170 can control the circulation flow rate of ink not only directly, but also indirectly via a separate hydraulic or pneumatic control module 175*a*.

In the second arrangement state, the control module 170 increases the flow rate of ink entering the second flow rate measurement part 162, by controlling the third control valve 143 if second ink flow rate information obtained from the second flow rate measurement part 162 is yet to reach a predetermined target value.

The control module 170 increases the flow rate of the ink entering the second flow rate measurement part 162, such that the second ink flow rate information can reach the target value.

An ink treatment method according to an embodiment of the present disclosure will hereinafter be described.

Figure 7:
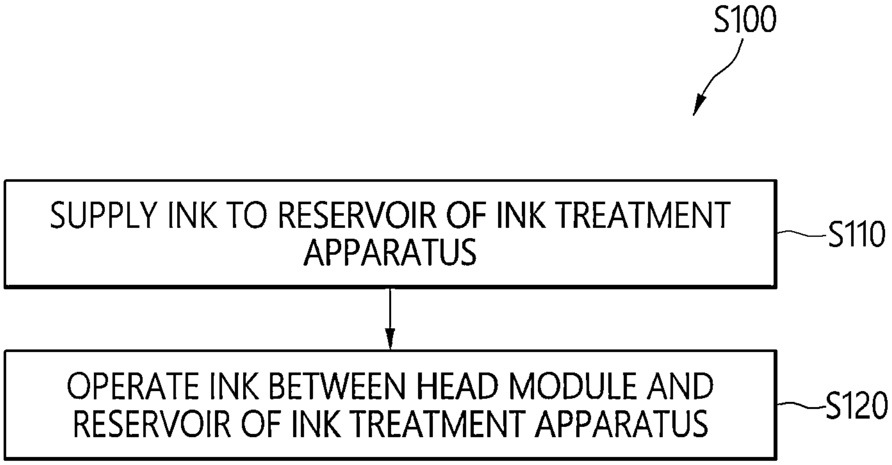
FIG. 7 is a flowchart illustrating an ink treatment method according to an embodiment of the present disclosure.

Referring to an ink treatment method S100 of FIG. 7, ink is supplied to a reservoir 110 of an ink treatment apparatus 100 (S110). Thereafter, the ink is operated between a head module 130 and the reservoir 110 of the ink treatment apparatus 100 (S120).

The ink treatment apparatus 100 controls the flow of the ink via a first control valve 141 and allows the ink to flow into the reservoir 110 and the head module 130 via fluid transfer lines 150.

A single pump 120 is installed in the fluid transfer lines 150 to pump the ink. A flow rate measurement module 160 is installed in the fluid transfer lines 150. The flow rate measurement module 160 measures the flow rate of the ink in accordance with the flow of the ink and provides ink flow rate information corresponding to the ink.

A control module 170 of the ink treatment apparatus 100 controls the pump 120 and the first control valve 141 based on the ink flow rate information and thereby controls the circulation ratio of the ink between the fluid transfer lines 150.

Figure 8:
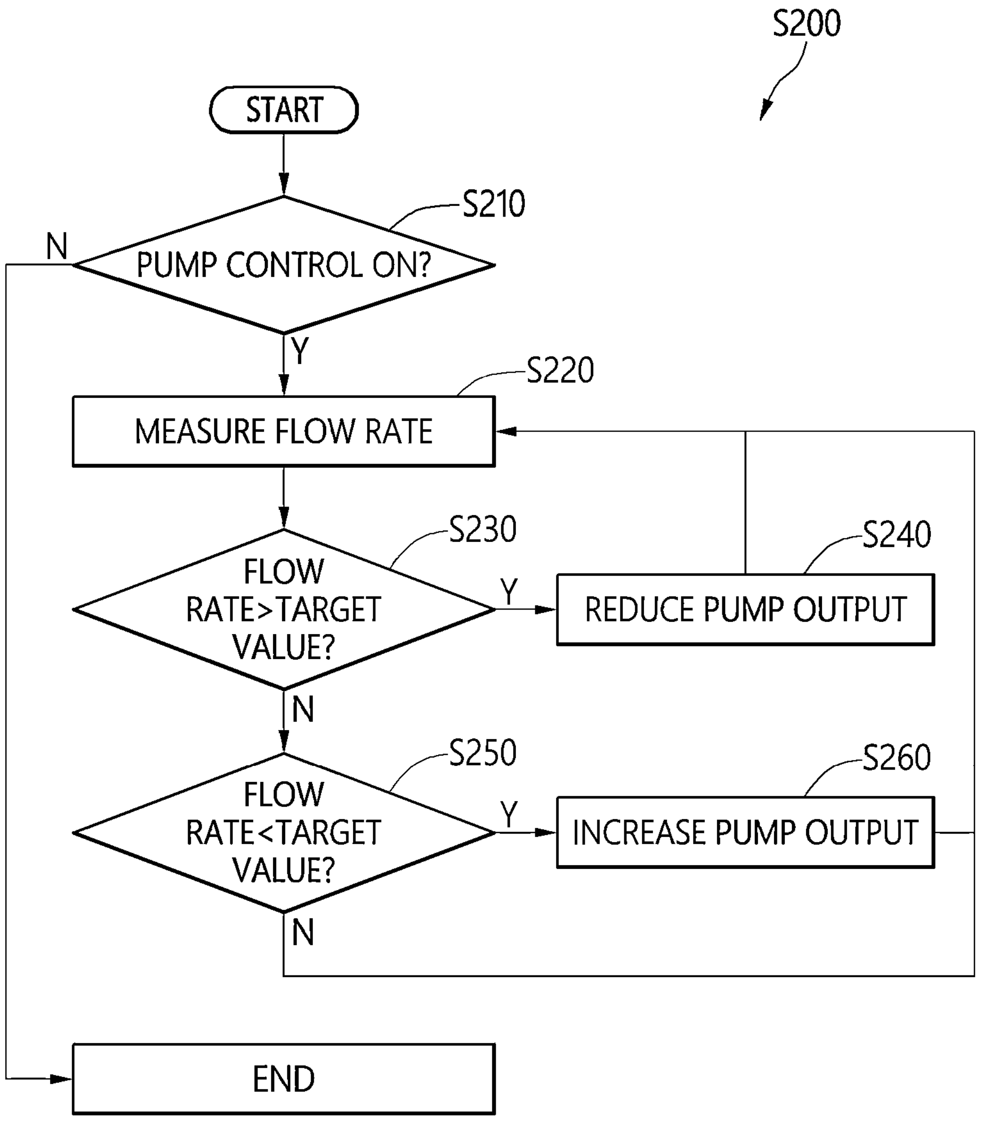
FIGS. 8 through 10 are flowcharts illustrating control methods in sequential order according to the embodiment of FIG. 7.

A first control method S200, which is a control method performed by the control module 170 of FIG. 4, will hereinafter be described with reference to FIG. 8. Referring to the first control method S200 of FIG. 8, the pump 120 performs a pumping operation (S210). The first flow rate measurement part 161 generates first ink flow rate information (S220).

The control module 170 determines whether a first flow rate included in the first ink flow rate information is greater than a predetermined target value (S230). If the first ink flow rate is greater than the target value, the control module 170 reduces the pumping output of the pump 120 (S240).

If the first ink flow rate is not greater than the target value, the control module 170 determines whether the first ink flow rate is less than the target value (S250). If the first ink flow rate is less than the target value, the control module 170 reduces the pumping output of the pump 120 (S260).

After S250 and S260, the first control method S200 returns to S210 so that S220, S230, S240, S250, and S260 may be repeatedly performed. If the control of the pump 120 is not performed, the first control method S200 ends.

Figure 9:
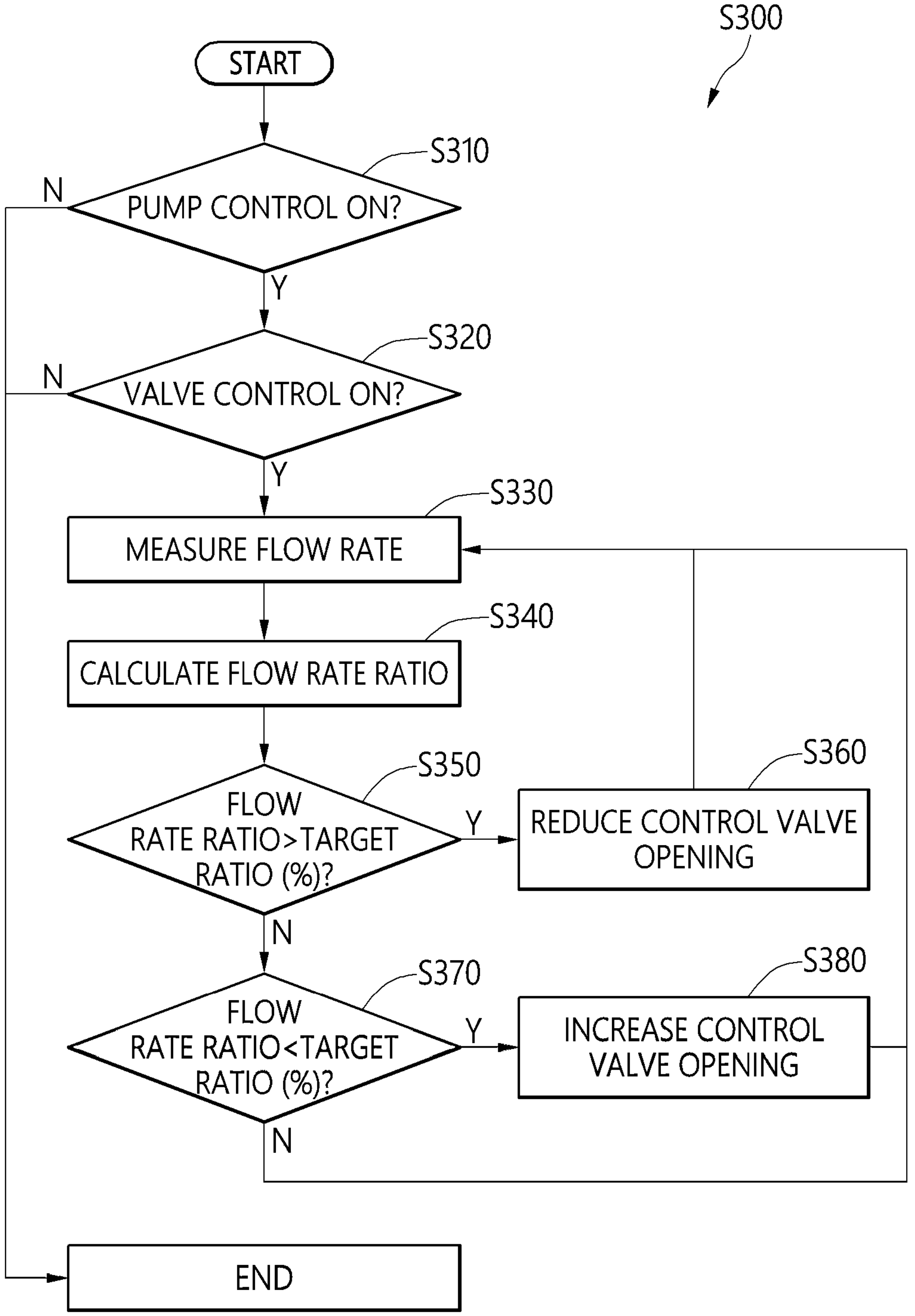

A second control method S300, which is a control method performed by the control module 170 of FIG. 5, will hereinafter be described with reference to FIG. 9. Referring to the second control method S300 of FIG. 9, the pump 120 performs a pumping operation (S310). The third control valve 143 performs a flow path opening/closing operation (S320). The second flow rate measurement part 162 generates second ink flow rate information (S330).

The control module 170 obtains (determines? calculates?) the flow rate ratio at the second flow rate measurement part 162 with respect to the first flow rate measurement part 161 based on first ink flow rate information and second flow rate information (S340).

The control module 170 determines whether the flow rate ratio at the second flow rate measurement part 162 is greater than a predetermined target value (S350). If the flow rate ratio at the second flow rate measurement part 162 is greater than the target value, the control module 170 reduces the amount by which the third control valve 143 is open and thereby reduces the flow rate (S360).

If the flow rate ratio at the second flow rate measurement part 162 is not greater than the target value, the control module 170 determines whether the flow rate ratio at the second flow rate measurement part 162 is less than the target value (S370). If the flow rate ratio at the second flow rate measurement part 162 is less than the target value, the control module 170 increases the amount by which the third control valve 143 is open and thereby increases the flow rate (S380).

After S360 and S380, the second control method S300 returns to S330 so that S340, S350, S360, S370, and S380 may be repeatedly performed. If at least one of S310 and S320 is not performed, the second control method S300 ends.

Figure 10:
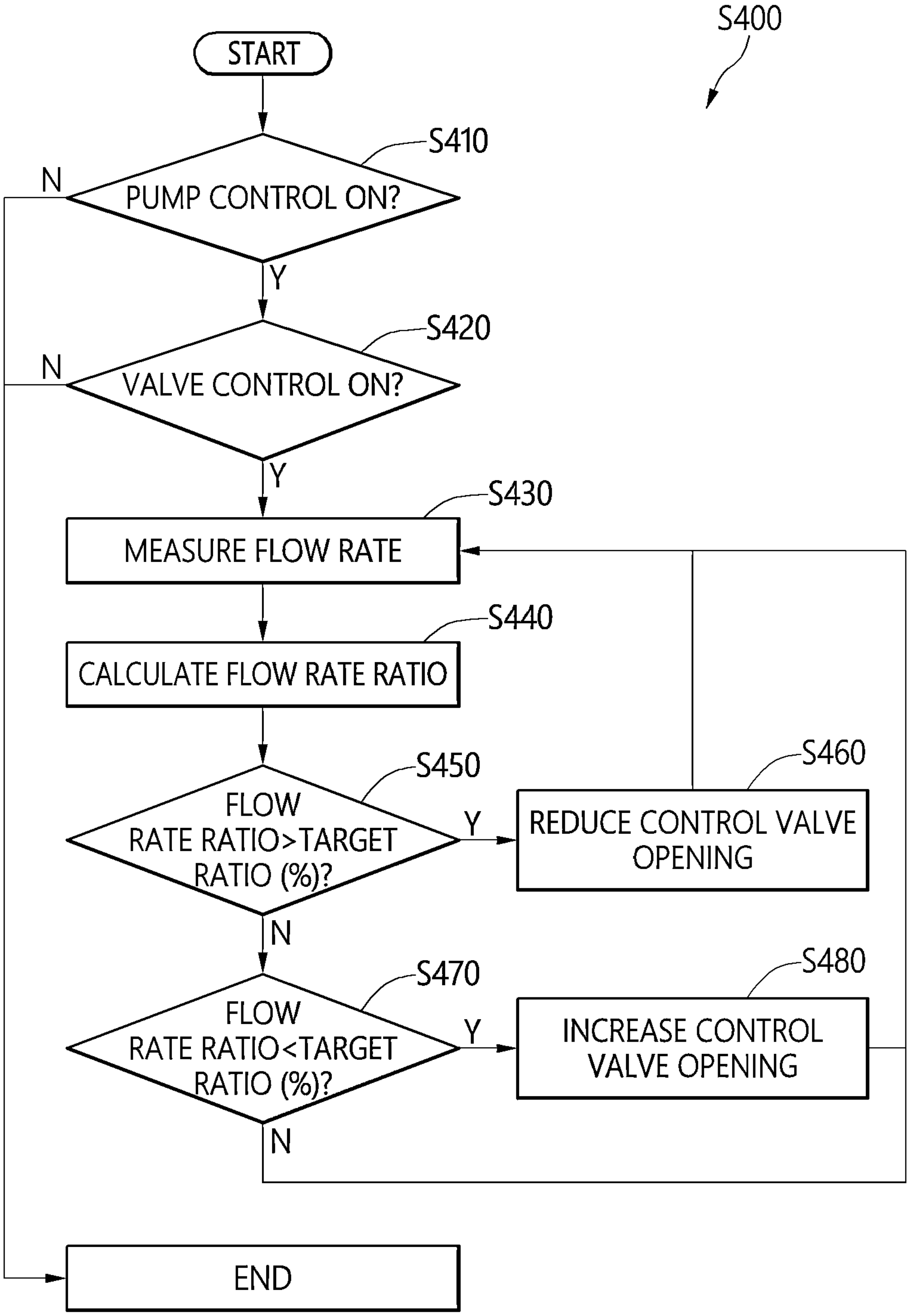

A third control method S400, which is a control method performed by the control module 170 of FIG. 6, will hereinafter be described with reference to FIG. 10. Referring to the third control method S400 of FIG. 10, the pump 120 performs a pumping operation (S410).

The second control valve 142 performs a flow path opening/closing operation (S420). The first flow rate measurement part 161 generates first ink flow rate information (S430). The control module 170 obtains (determines? calculates?) the flow rate ratio at the second control valve 142 based on the first ink flow rate information (S440).

The control module 170 determines whether the flow rate ratio at the second control valve 142 is greater than a predetermined target value (S450). If the flow rate ratio at the second control valve 142 is greater than the target value, the control module 170 reduces the amount by which the second control valve 142 is open and thereby reduces the flow rate (S460).

If the flow rate ratio at the second control valve 142 is not greater than the target value, the control module 170 determines whether the flow rate ratio at the second control valve 142 is less than the target value (S470). If the flow rate ratio at the second control valve 142 is less than the target value, the control module 170 increases the amount by which the second control valve 142 is open and thereby increases the flow rate (S480).

After S460 and S480, the second control method S300 returns to S430 so that S440, S450, S460, S470, and S480 may be repeatedly performed. If at least one of S410 and S420 is not performed, the third control method S400 ends.

Embodiments of the present disclosure have been described above with reference to the accompanying drawings, but the present disclosure is not limited thereto and may be implemented in various different forms. It will be understood that the present disclosure can be implemented in other specific forms without changing the technical spirit or gist of the present disclosure. Therefore, it should be understood that the embodiments set forth herein are illustrative in all respects and not limiting.

What is claimed is:

1. An ink treatment apparatus comprising:
a reservoir configured to store ink;
a head module configured to eject the ink;
a first control valve configured to control a flow of the ink;
a plurality of fluid transfer lines installed between the reservoir and the head module and configured to flow the ink therethrough;
a pump installed in the fluid transfer lines and configured to pump the ink;
a flow rate measurement module installed in the fluid transfer lines, the flow rate measurement module configured to measure a flow rate of the ink in accordance with the flow of the ink and provide ink flow rate information, the ink flow rate information being regarding the flow rate of the ink; and
a control module configured to control a circulation ratio of the ink between the fluid transfer lines by controlling the pump and the first control valve based on the ink flow rate information,
wherein the fluid transfer lines include a supply line, a retrieval line, and a circulation line, the supply line being a first path and configured to allow the reservoir and the head module to communicate with each other, the retrieval line being a second path different from the first path and configured to allow the reservoir and the head module to communicate with each other, and the circulation line being a third path different from the first path and configured to communicate with the retrieval line such that the ink can be supplied to the retrieval line.

2. The ink treatment apparatus of claim 1, wherein the control module is configured to control a circulation flow rate ratio of the ink between the first, second, and third paths by controlling the first control valve.

3. The ink treatment apparatus of claim 2, wherein the flow rate measurement module includes a first flow rate measurement part installed in the retrieval line and configured to provide first ink flow rate information of the retrieval line as at least a portion of the ink flow rate information.

4. The ink treatment apparatus of claim 3, wherein
the pump is installed in the retrieval line, and
the retrieval line includes a first retrieval line and a second retrieval line, the first retrieval line corresponding to part of the retrieval line between the pump and the reservoir, the second retrieval line corresponding to part of the retrieval line between the pump and the head module.

5. The ink treatment apparatus of claim 4, wherein the first flow rate measurement part is installed in the first retrieval line and is configured to provide the first ink flow rate information in response to the ink being pumped by the pump.

6. The ink treatment apparatus of claim 5, wherein the pump is configured to pump and supply the ink from the second retrieval line and the circulation line into the first retrieval line.

7. The ink treatment apparatus of claim 5, wherein
the first control valve is installed in the second retrieval line, and
the control module is configured to perform a first control operation of controlling the flow rate of the ink supplied from the head module to the pump, via the first control valve and the pump.

8. The ink treatment apparatus of claim 7, wherein the control module is configured to primarily perform the first control operation based on the first ink flow rate information, obtain first updated ink flow rate information, which is updated first ink flow rate information, from the first flow rate measurement part in response to the first control operation, and perform a second control operation of controlling the flow rate of the ink supplied from the head module to the pump, based on the first updated ink flow rate information via the first control valve and the pump.

9. The ink treatment apparatus of claim 8, wherein the control module is configured to perform control in a feedback manner via a second control operation based on a first control operation of the first flow rate measurement part and via an n-th control operation based on the second control operation such that a flow rate ratio can be reached.

10. The ink treatment apparatus of claim 8, wherein the flow rate measurement module further includes a second flow rate measurement part installed in the circulation line and configured to provide second ink flow rate information of the circulation line as at least a portion of the ink flow rate information.

11. The ink treatment apparatus of claim 10, wherein the control module is configured to primarily perform the first control operation based on the first ink flow rate information and the second ink flow rate information, obtain second updated ink flow rate information, which is updated second ink flow rate information, from the second flow rate measurement part in response to the first control operation, and perform the second control operation based on the first updated ink flow rate information and the second updated ink flow rate information.

12. The ink treatment apparatus of claim 11, further comprising:
a second control valve different from the first control valve,
wherein
the second control valve is installed in the supply line, and
the control module is configured to perform the first and second control operations by controlling the pump and the first and second control valves.

13. The ink treatment apparatus of claim 12, further comprising:
a third control valve different from the first control valve,
wherein
the third control valve is installed in the circulation line, and
the control module is configured to perform the first and second control operations by controlling the first, second, and third control valves.

14. The ink treatment apparatus of claim 13, wherein the circulation line includes a first circulation line and a second circulation line, the first circulation line corresponding to part of the circulation line between the second flow rate measurement part and the retrieval line, the second circulation line corresponding to part of the circulation line between the second flow rate measurement part and the supply line.

15. The ink treatment apparatus of claim 14, wherein the third control valve is installed in the second circulation line and is in one of a first arrangement state where the second circulation line is not positioned collinearly with the first circulation line and with the second flow rate measurement part and a second arrangement state where the second circulation line is positioned collinearly with the first circulation line and with the second flow rate measurement part.

16. The ink treatment apparatus of claim 15, wherein in the first arrangement state, if the second ink flow rate information is yet to reach a target value, the control module is configured to increase the flow rate of the ink in the retrieval line by controlling the pump such that as the ink supplied from the circulation line joins the retrieval line, the second ink flow rate information can reach the target value.

17. The ink treatment apparatus of claim 15, wherein in the second arrangement state, if a second ink flow rate included in the second ink flow rate information is yet to reach a target value, the control module is configured to increase the flow rate of the ink entering the second flow rate measurement part, by controlling the third control valve such that the second ink flow rate included in the second ink flow rate information can reach the target value.

18. An ink treatment apparatus comprising:

a reservoir configured to store ink;

a head module configured to eject the ink;

a first control valve configured to control a flow of the ink;

a plurality of fluid transfer lines installed between the reservoir and the head module and configured to flow the ink therethrough;

a pump installed in the fluid transfer lines and configured to pump the ink;

a flow rate measurement module installed in the fluid transfer lines, the flow rate measurement module configured to measure a flow rate of the ink in accordance with the flow of the ink and provide ink flow rate information, the ink flow rate information being information regarding the flow rate of the ink; and a control module configured to control a circulation ratio of the ink between the fluid transfer lines by controlling the pump and the first control valve based on the ink flow rate information, wherein the fluid transfer lines include a supply line, a retrieval line, and a circulation line, the supply line being a first path and configured to allow the reservoir and the head module to communicate with each other, the retrieval line, being a second path different from the first path and configured to allow the reservoir and the head module to communicate with each other, the circulation line being a third path different from the first path and configured to communicate with the retrieval line such that the ink can be supplied to the retrieval line, the flow rate measurement module includes a first flow rate measurement part and a second flow rate measurement part, the first flow rate measurement part installed in the retrieval line and configured to provide first ink flow rate information of the retrieval line, the second flow rate measurement part installed in the circulation line and configured to provide second ink flow rate information of the circulation line, the control module is configured to control a circulation flow rate ratio of the ink between the first, second, and third paths based on the first ink flow rate information and the second flow rate information, and the ink treatment apparatus includes a first condition that the circulation line is positioned above at least part of the supply line in a length direction toward the head module and a second condition that an inner diameter of the supply line is equal to or greater than an inner diameter of the circulation line.

19. An ink treatment method comprising:

supplying and storing ink in a reservoir of an ink treatment apparatus; and operating the ink between a head module and the reservoir of the ink treatment apparatus, wherein the ink treatment apparatus includes a first control valve configured to control a flow of the ink, a plurality of fluid transfer lines installed between the reservoir and the head module and configured to flow the ink therethrough, a pump installed in the fluid transfer lines and configured to pump the ink, a flow rate measurement module installed in the fluid transfer lines, configured to measure a flow rate of the ink in accordance with the flow of the ink, and configured to provide ink flow rate information that is information regarding the flow rate of the ink, and a control module configured to control a circulation ratio of the ink between the fluid transfer lines by controlling the pump and the first control valve based on the ink flow rate information, and wherein the plurality of fluid transfer lines include a supply line, a retrieval line, and a circulation line, the supply line being a first path and configured to allow the reservoir and the head module to communicate with each other, the retrieval line being a second path different from the first path and configured to allow the reservoir and the head module to communicate with each other, and the circulation line being a third path different from the first path and configured to communicate with the retrieval line such that the ink can be supplied to the retrieval line.

* * * * *